United States Patent
Changlani et al.

(10) Patent No.: US 12,317,172 B2
(45) Date of Patent: May 27, 2025

(54) RECONFIGURING BEACON FRAMES TO MINIMIZE NETWORK OUTAGE

(71) Applicant: Hewlett Packard Enterprise Development LP, Houston, TX (US)

(72) Inventors: Nitin A. Changlani, San Jose, CA (US); Abhiruchi Dakshinkar, San Jose, CA (US); Qiang Zhou, San Jose, CA (US); Myung Cheol Kim, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 502 days.

(21) Appl. No.: 17/662,950

(22) Filed: May 11, 2022

(65) Prior Publication Data

US 2023/0370952 A1    Nov. 16, 2023

(51) Int. Cl.
  *H04W 48/10*    (2009.01)
  *H04L 12/46*    (2006.01)
(52) U.S. Cl.
  CPC ......... *H04W 48/10* (2013.01); *H04L 12/4641* (2013.01)
(58) Field of Classification Search
  CPC .......................... H04W 48/10; H04L 12/4641
  USPC .............................. 455/434, 450, 452.1, 418
  See application file for complete search history.

(56) References Cited

U.S. PATENT DOCUMENTS

| | | | |
|---|---|---|---|
| 10,237,891 B1 | 3/2019 | Chu et al. | |
| 10,938,644 B2 | 3/2021 | Xiao et al. | |
| 2003/0112820 A1* | 6/2003 | Beach | H04W 84/12 370/465 |
| 2004/0252637 A1* | 12/2004 | Laberteaux | H04W 84/00 370/216 |
| 2005/0261970 A1* | 11/2005 | Vucina | G06Q 20/20 705/16 |
| 2021/0385220 A1 | 12/2021 | Beaudin et al. | |
| 2022/0086638 A1* | 3/2022 | Molinari | G06K 7/1426 |

FOREIGN PATENT DOCUMENTS

WO    2021/262092 A1    12/2021

OTHER PUBLICATIONS

Adrian Granados, The Multiple BSSID element: Improving airtime efficiency, Aug. 24, 2021, 4 Pgs.

* cited by examiner

*Primary Examiner* — Nghi H Ly
(74) *Attorney, Agent, or Firm* — Hewlett Packard Enterprise Patent Department (57) ABSTRACT

Examples described herein relate to a method for reconfiguring a beacon by an access point (AP) to minimize or avoid network outages experienced by client devices connected to the AP. The AP transmits a beacon comprising a basic service set identifier (BSSID) field and a Multiple BSSID (MBSSID) element. The MBSSID element corresponds to an MBSSID set comprising a transmitted BSSID associated with a transmitted virtual access point (VAP) and a non-transmitted BSSID associated with a non-transmitted VAP, where the BSSID field in the beacon is set to the transmitted BSSID. Further, the AP reconfigures the beacon to generate a reconfigured beacon upon determining that the transmitted VAP is non-functional. In particular, the BSSID field in the reconfigured beacon is set to the non-transmitted BSSID of the MBSSID set. Moreover, the AP transmits the reconfigured beacon to the client device.

15 Claims, 6 Drawing Sheets

RECONFIGURING BEACON FRAMES TO MINIMIZE NETWORK OUTAGE

BACKGROUND

Virtual Access Points (VAPs) may be created in a physical Access Point (AP). Each of these VAPs is configured with a unique Basic Service Set Identifier (BSSID) and appears as an individual AP to client devices. In some implementations, to improve airtime efficiency, support for a Multiple Basic Service Set Identifier (MBSSID) set is suggested in 802.11ax Specification by the Institute of Electrical and Electronics Engineers (IEEE) (hereinafter referred to as IEEE 802.11ax Specification). As per the IEEE 802.11ax Specification, instead of sending individual beacons for each VAP, the AP may send a single beacon for the VAPs that are part of the MBSSID set.

BRIEF DESCRIPTION OF THE DRAWINGS

One or more examples in the present disclosure are described in detail with reference to the following Figures. The Figures are provided for purposes of illustration only and merely depict examples.

The Figures are not exhaustive and do not limit the present disclosure to the precise form disclosed.

DETAILED DESCRIPTION

Today, advances in wireless networking technologies drive technological improvements in other technologies and industries. For example, various industries rely on wireless networking technologies for the communication, storage, and delivery of data and services. In wireless networks, client devices wirelessly connect to a network through an AP. Increasing usage of wireless networking technologies, among other factors, creates various technological challenges in the field of wireless networking. The IEEE has issued various standard Specifications, such as the 802.11 Specifications to address various challenges in the field of wireless networking technologies. For instance, as various technologies increasingly rely on wireless networking technologies, there becomes a need to expand the capabilities of wireless networks to accommodate larger numbers of devices with varying configurations. For example, configuring the VAPs on an AP allows the AP to present itself as multiple APs. To client devices, a VAP appears as a separate AP. A VAP can be configured with respective network properties, such as authentication and encryption, and its set of network properties can be indicated by a unique BSSID. Thus, each VAP can be associated with a BSSID configured with a set of network properties associated with the VAP.

Typically, an AP announces a wireless network by transmitting a beacon frame. In the case of an AP configured with multiple VAPs, the AP typically broadcasts a beacon frame for each VAP of the multiple VAPs, where the beacon frame includes a BSSID associated with the VAP. The beacon frames are broadcasted to the client devices. The client devices use the BSSID included in the beacon frames to determine a VAP to connect. In some deployments, an AP can support multiple wireless networks using multiple VAPs. For example, in some APs, up to sixteen VAPs may be configured on each radio and the AP may support multiple radios (e.g., 2.4 GHz, 5 GHz, and/or 6 GHz). In these deployments, broadcasting a separate beacon frame for each VAP (i.e., for each BSSID) may be inefficient and degrade the connection quality of the wireless networks.

A technique to address the inefficiencies and network degradation associated with broadcasting separate beacon frames entails implementing an MBSSID set in accordance with IEEE 802.11ax Specification. The MBSSID set is a group of VAPs hosted on an AP for which the AP can make use of common management frames, such as, beacon and probes, for example. A beacon frame corresponding to the MBSSID set is hereinafter referred to as an MBSSID beacon. In the MBSSID beacon, a BSSID field is set to a BSSID of one of the VAPs of the MBSSID set. The VAP whose BSSID is used in the BSSID field in the MBSSID beacon is referred to as a transmitted VAP and its BSSID is referred to as a transmitted BSSID. The rest of the VAPs of the MBSSID set are referred to as non-transmitted VAP and their BSSIDs are referred to as non-transmitted BSSIDs. Information associated with the non-transmitted VAPs is included in the MBSSID using inheritance. In general, information associated with the non-transmitted VAPs that is different from the transmitted VAP (e.g., non-inherited information) is included in the MBSSID. Information associated with the non-transmitted VAPs that are the same as the transmitted VAP (e.g., inherited information) is inferred from the information associated with the transmitted VAP that is included in the MBSSID. In particular, the MBSSID beacon includes an MBSSID element comprising information about the MBSSID set in a manner that allows client devices to determine the network properties for each non-transmitted VAP (i.e., non-transmitted BSSID) in the MBSSID set. Broadcasting the MBSSID beacons allows the AP to use fewer beacon frames than the AP would by broadcasting separate beacon frames individually for each VAP.

While the use of the MBSSID set allows APs to broadcast information associated with a plurality of VAPs forming the MBSSID set with improved airtime efficiency, the use of the MBSSID set faces various technological challenges. For example, making changes to a transmitted VAP associated with an MBSSID set may involve interrupting services for all VAPs associated with the MBSSID as the change is made and the MBSSID is updated. Typically, when the transmitted VAP is made non-functional (e.g., deleted or inactivated), all of the non-transmitted VAPs of the MBSSID set are inactivated. This results in the disconnection of the client devices connected to such non-transmitted VAPs as the client devices may not have been configured to process MBSSID beacons with any BSSID other than the transmitted BSSID. Consequently, the client devices connected to the non-transmitted VAPs of the MBSSID set experiences a massive outage as it will result in the de-authentication of all the client devices connected to the different VAPs that are part of the MBSSID set. These interruptions may be exacerbated in deployments involving numerous VAPs.

In accordance with some examples, a method for addressing such technological challenges caused by implementing an MBSSID set on an AP is presented. In particular, an example method proposed herein avoids or minimizes the downtime faced by the client devices in the event the transmitted VAP of the MBSSID set becomes non-functional (e.g., deleted or inactivated). In accordance with some examples presented herein, the AP transmits an MBSSID beacon having a BSSID field that is set to a BSSID of a transmitted VAP (i.e., a transmitted BSSID). Further, the AP continuously monitors any configuration changes with respect to the VAPs and upon determining that the transmitted VAP is non-functional (e.g., deleted or inactivated), the AP dynamically reconfigures the MBSSID beacon to generate a reconfigured MBSSID beacon. In particular, such reconfiguration involves setting the BSSID field in the reconfigured beacon to a BSSID of the non-transmitted VAP (i.e., a non-transmitted BSSID) of the MBSSID set. The AP then broadcasts the reconfigured MBSSID beacon to reduce or avoid network outage for client devices associated with the non-transmitted VAP when the transmitted VAP is non-functional.

Further, in accordance with the examples presented herein, the client devices filter the received frames using a frame filtering logic. In particular, in traditional approaches, a client device compares the BSSID field in the frames (e.g., MBSSID beacons) that it receives with the transmitted BSSID, or the non-transmitted BSSID which the client device is associated with. The frames with the BSSID field matching the transmitted BSSID or such non-transmitted BSSID to which the client device is associated are processed by the client device. In accordance with the examples presented herein, the client devices are configured with updated frame filtering logic that is designed to make use of contiguously arranged BSSIDs in the MBSSID set. In particular, instead of a client device filtering the frames based on a complete BSSID field, the client device is preconfigured to filter the beacons based on a predetermined number of most significant bits (MSBs) of the BSSID field so that the client device can process the beacons from any of the BSSID of the MBSSID set. In particular, with the client device filtering the incoming MBSSID beacons based on the predetermined number of MSBs, the client device can process the MBSSID beacons with the BSSID field set to any BSSID (transmitted or non-transmitted) of the MBSSID set. The use of such reconfigured MBSSID beacon and the updated frame filter logic at the client device avoids or minimizes the need for de-authenticating the client device and thereby reducing the network outage for the client device. The reduced network outage improves the reliability of the wireless network established via the AP.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Figure 1:
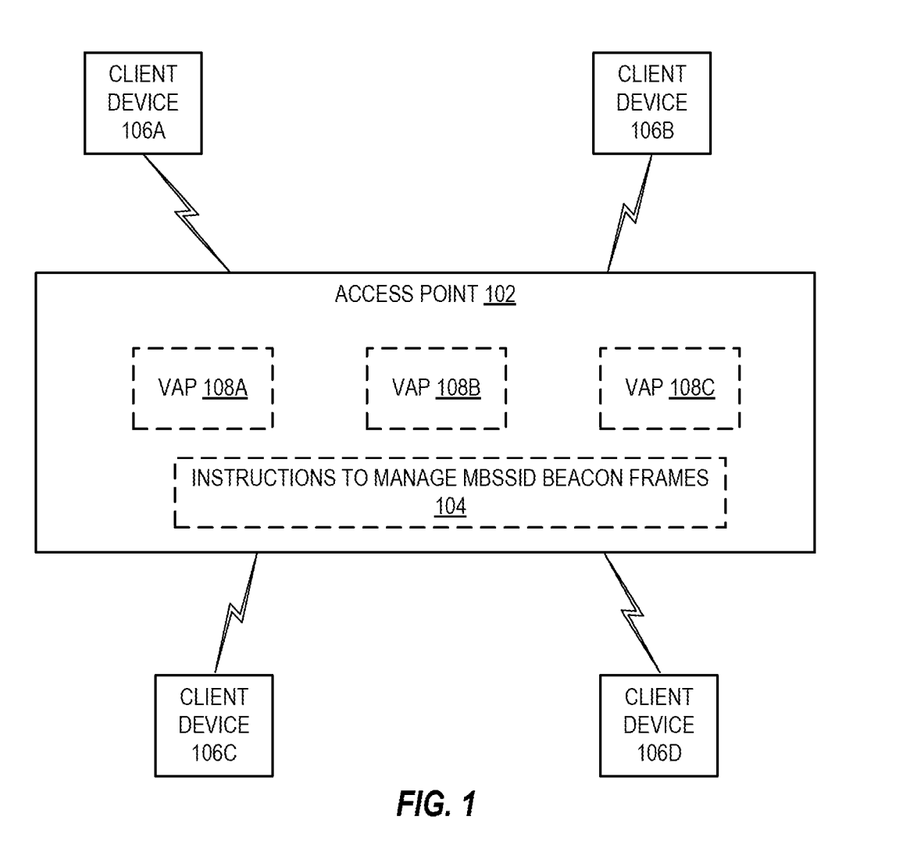
FIG. 1 depicts a system in which various of the examples presented herein may be implemented.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may be implemented in any setup for example, in a home setup or in an organization, such as a business, educational institution, governmental entity, healthcare facility, or other organization. The system 100 depicts a network of devices (hereinafter referred to as network devices) for example, an AP 102 and a plurality of client devices 106A, 106B, 106C, and 106D (hereinafter referred to as client devices 106A-106D). The system 100 may include a greater or fewer number of APs and the client devices than depicted in FIG. 1.

The client devices 106A-106D may be electronic devices capable of wirelessly communicating with an AP 102 or other electronic devices. Examples of client devices 106A-106D may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, Internet of Things (IoT) devices, and the like. Communications between the AP 102 and the client devices 106A-106D in the system 100 may be facilitated via wireless communication links according to the wireless communication protocols such as 802.11 standards, Wi-Fi Alliance Specifications, or any other wireless communication standards. In some examples, the communication between the client devices 106A-106D and the AP 102 may be carried out in compliance with IEEE 802.11ax Specification.

The AP 102 may be a combination of hardware, software, and/or firmware that is configured to provide wireless network connectivity to the client devices 106A-106D. In some examples, the AP 102 may comprise, be implemented as, or known as a radio router, radio transceiver, a switch, a Wi-Fi hotspot device, Basic Service Set (BSS) device, Extended Service Set (ESS) device, radio base station (RBS), or some other terminology and may act as a point of network access for the client devices 106A-106D. Although not shown, in some examples, the system 100 may include additional network devices such as, but not limited to, additional APs, wireless local area network (WLAN) controllers, network switches, gateway devices, routers, and the like. Via the AP 102, the client devices 106A-106D may communicate with each other and/or with any other network device to which the AP 102 is communicatively connected (e.g., the network switches, the WLAN controller, and/or gateway devices).

In some examples, the AP 102 may include a processing resource and/or a machine-readable storage medium for the AP to execute several operations as will be described in the greater details below. The machine-readable storage medium may be non-transitory and is alternatively referred to as a non-transitory machine-readable storage medium that does not encompass transitory propagating signals. The machine-readable storage medium may be any electronic, magnetic, optical, or any other storage device that may store data and/or executable instructions. Examples of the machine-readable storage medium that may be used in the AP 102 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, and the like. The machine-readable storage medium may be encoded with executable instructions 104 (depicted using dashed box in FIG. 1) for managing beacon frames (e.g., MBSSID beacons) transmitted by the AP 102. Although not shown, in some examples, the machine-readable storage medium may be encoded with certain additional executable instructions to perform any other operations performed by the AP 102, without limiting the scope of the present disclosure.

The processing resource may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium, or combinations thereof. The processing resource may fetch, decode, and execute the instructions 104 stored in the machine-readable storage medium to manage the MBSSID beacons transmitted by the AP 102. As an alternative or in addition to executing the instructions 104, the processing resource may include at least one integrated circuit (IC), control logic, electronic circuits, or combinations thereof that include a number of electronic components for performing the functionalities intended to be performed by the AP 102.

Further, as shown in FIG. 1, the AP 102 may be configured with a set of logical entities such as VAPs 108A, 108B, and 108C (hereinafter collectively referred to as VAPs 108A-108C) that are depicted using dashed boxes in FIG. 1. To a client device, the VAP appears as an independent AP with a wireless network name, commonly referred to as, a service set identifier (SSID). In the example implementation of FIG. 1, the VAPs 108A-108C configured on the AP 102 may appear as three independent APs advertised via respective SSIDs to the client devices 106A-106D. The client devices 106A-106D may associate with any of the VAPs 106A-106D as if they are associating with any physical AP. For illustration purposes, the AP 102 is shown as configured with three VAPs 106A-106D. In some examples, the AP 102 may be configured with a greater or fewer number of VAPs than depicted in FIG. 1 without limiting the scope of the present disclosure.

Each of the VAPs 108A-108C is associated with a unique BSSID configured with a set of network properties associated with the VAP. A BSSID of a given VAP may act as a unique address for the given VAP. In one example, the BSSID may be expressed as a unique string of hexadecimal numbers of predefined length. In some examples, the VAPs 108A-108C may be executed by the processing resource of the AP to enable communication capabilities of the VAPs 108A-108C. Further, in some examples, the AP 102 stores configuration data of each of the VAP 108A-108C in the machine-readable storage medium. The configuration data for a given VAP may include settings such as radio details, SSID, channel information, BSSID, communication capabilities, and the like. In the present implementation of FIG. 1, the AP 102 implements support for an MBSSID set and inserts an MBSSID element in several frames that it broadcasts to enhance airtime efficiency. In particular, the AP 102 combines information regarding the VAPs 108A-108C into a single MBSSID set. An example configuration of the MBSSID set implemented by the AP 102 is shown in FIG. 2.

Figure 2:
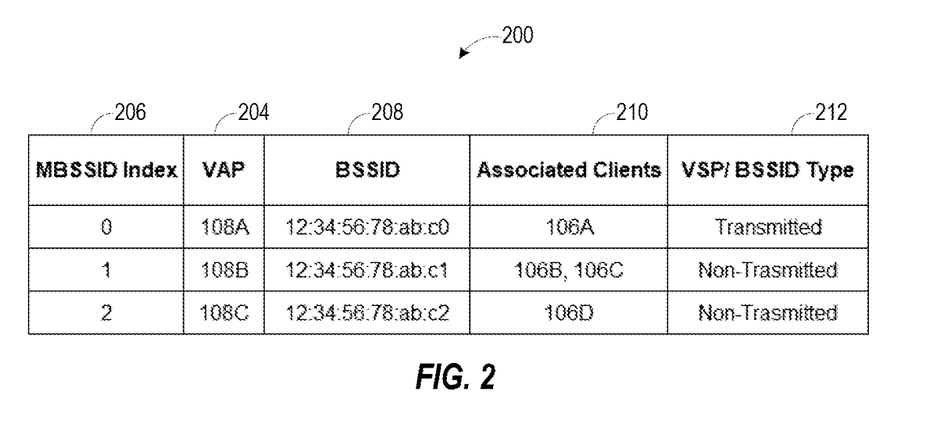
FIG. 2 depicts a configuration corresponding to an example MBSSID set.

Turning to FIG. 2, a configuration corresponding to an example MBSSID set is presented in the form of a table 200 for illustration purposes. The table 200 lists VAPs, respective BSSIDs, MBSSID index, associated clients, and VAP/BSSID types in the MBSSID set. For example, a column 204 includes a listing of the VAPs 108A-108C, a column 206 lists the corresponding index numbers of the VAPs 108A-108C in the MBSSID set, and the column 208 lists example contiguous BSSIDs corresponding to the VAPs 108A-108C. The MBSSID index corresponding to the non-transmitted VAPs may be included in the MBSSID beacons transmitted by the AP 102 and it is used by the client devices 106A-106D to deduce non-transmitted BSSIDs based on the transmitted BSSID. Further, column 210 lists associated client devices for each of the VAPs 108A-108C, and a column 212 depicts the type of each of the VAPs 108A-108C (or the BSSID) for the given MBSSID set. As depicted in FIG. 2, the VAP 108A is configured as a transmitted VAP on the AP 102 meaning the AP 102 uses the BSSID of the VAP 108A in a BSSID field in a media access control (MAC) header of one or more management frames (e.g., a beacon frames).

Referring again to FIG. 1, in some examples, the AP 102 transmits beacon frames including an MBSSID element (generally being identified as an element 71 as per IEEE 802.11ax Specification). In the description hereinafter, a beacon frame transmitted by the AP 102 having the MBSSID element is also referred to as "MBSSID beacon frame" or "MBSSID beacon." In the MBSSID beacon, the AP may include the BSSID of the VAP 108A (e.g., "12:34:56:78:ab:c0") in a BSSID field as a transmitted BSSID. An example MBSSID beacon transmitted by the AP 102 is described in conjunction with FIG. 3.

As noted earlier, in traditional approaches using the MBSSID set, if the transmitted VAP is made non-functional (e.g., deleted or inactivated), all of the non-transmitted VAPs of the MBSSID set are inactivated. This results in the disconnection of the client devices connected to such non-transmitted VAPs. Consequently, the client devices connected to the non-transmitted VAPs of the MBSSID set experiences a massive outage as it will result in de-authentication of all the client devices connected to the different VAPs that are part of the MBSSID set. These interruptions may be exacerbated in deployments involving numerous VAPs. In accordance with the examples presented herein, the AP 102 is configured to address this issue by dynamically reconfiguring the MBSSID beacons that the AP 102 transmits to the client devices 106A-106D. In particular, the AP 102 continuously monitors any configuration changes with respect to the transmitted VAP (e.g., the VAP 108A) and upon determining that the transmitted VAP is non-functional (e.g., deleted or inactivated), the AP 102 dynamically reconfigures the MBSSID beacon to generate a reconfigured MBSSID beacon.

The dynamic reconfiguration as used herein may refer to the AP reconfiguring the MBSSID beacon upon detecting that transmitting VAP/BSSID is non-functional and without disconnecting the client devices associated with the non-transmitted VAPs. In some examples, the reconfiguration of MBSSID beacon involves replacing the transmitted BSSID with one of the plurality of non-transmitted BSSIDs of the MBSSID set in response to determining that the transmitted VAP is non-functional. For example, AP may select the VAP 108B to become a transmitted VAP by updating the BSSID field in the reconfigured MBSSID beacon to the BSSID of the VAP 108B. In some examples, the AP 102 may randomly select the non-transmitted BSSID from the MBSSID set. In certain examples, the AP 102 may select the non-transmitted BSSID for inclusion in the BSSID field 308 based on preconfigured VAP selection criteria without limiting the scope of the present disclosure. An example reconfigured MBSSID beacon is described in conjunction with FIG. 4.

After the reconfigured beacon is generated, the AP 102 broadcasts the reconfigured MBSSID beacon to the client devices 106A-106D. In some examples, the client devices 106A-106D are configured to filter the received frames using a frame filtering logic. In accordance with the examples presented herein, the client devices 106A-106D are configured with updated frame filtering logic that is designed to make use of contiguously arranged BSSIDS (see FIG. 2) in the MBSSID set. In particular, instead of a client device (e.g., any of the client devices 106A-106D) filtering the frames based on a complete BSSID field of the beacon (original or reconfigured), the client device is configured to filter the beacons based on a predetermined number of most significant bits (MSBs) of the BSSID field so that the client device can process the beacons from any of the BSSID of the MBSSID set. In one example, the client device may identify the most significant M bits based on a MaxBSSID indicator in an MBSSID element of the beacon. The MaxBSSID indicator represents an integer value (n) such that a maximum number of BSSIDs supported by the MBSSID set is $2^n$. The client device may determine a number of the most significant M bits as a difference between the length of the BSSID field (i.e., the number of bits of the BSSID which is 48 in the example of FIG. 2). In one example, the most significant M bits may be calculated using the relationship of Equation (1).

$$M = L - n \qquad \text{Equation (1)}$$

where, and L is a length of the BSSID field in the MBSSID beacon (e.g., original or reconfigured that it receives). In the ongoing example, if MaxBSSID indicator n=4 for and the size of the transmitted BSSID is 48 bits, the most significant M bits are 44 (=48−4). Because the BSSIDs in the MBSSID set are contiguous, if the client devices 106A-106D are configured to accept the MBSSID beacons that match the most significant M bits (e.g., "12:34:56:78:ab:c") that are common across all the BSSIDs in the MBSSID set, the client devices 106A-106D can process MBSSID beacons with any of the BSSID that is part of the MBSSID set.

In particular, with the client device filtering the incoming beacon frames based on the predetermined number of MSBs, the client device can process the MBSSID beacons with the BSSID field set to any non-transmitted BSSID of the MBSSID set. The use of such reconfigured MBSSID beacon and the updated frame filter logic at the client device avoids or minimizes the need for de-authenticating the client device and thereby reducing the network outage for the client device. The reduced network outage improves the reliability of the wireless network established via the AP.

Figure 3:
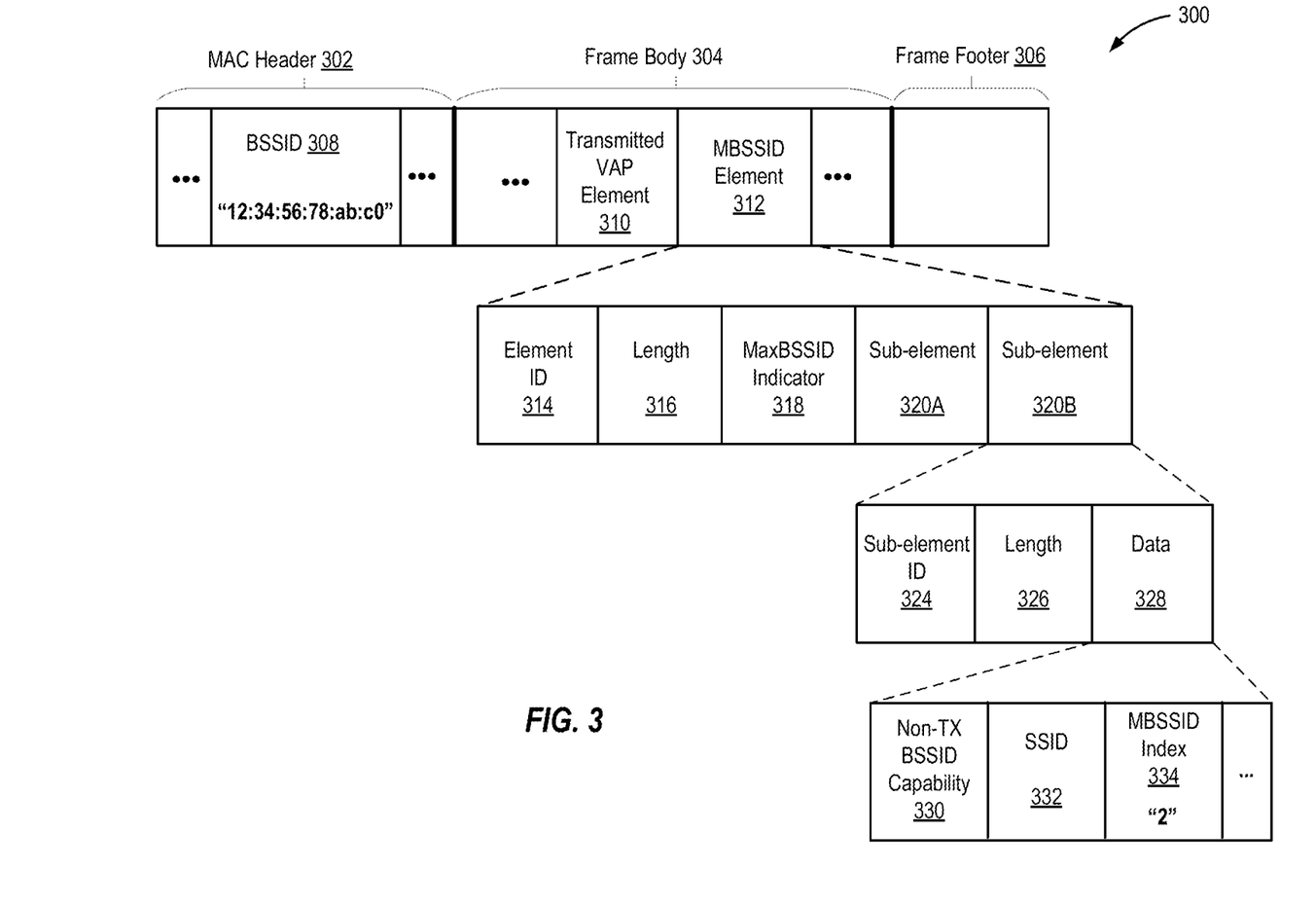
FIG. 3 depicts a block diagram illustrating a frame structure of an MBSSID beacon.

Referring now to FIG. 3, a block diagram illustrating a frame structure of an example MBSSID beacon 300 is presented. The MBSSID beacon 300 includes fields such as a MAC header 302, a frame body 304, and a frame footer 306. For simplicity of illustration and description, the several sub-fields within the MAC header 302, the frame body 304, and the frame footer 306 are not depicted in FIG. 3. The frame footer 306 includes Frame Check Sequence (FCS) for error detection in transmission. In particular, the FCS is used to validate the content of the MBSSID beacon 300 to understand whether it has not been tampered with or corrupted during the transmission. Along with other header sub-fields (e.g., frame control, duration, a destination address, a source address—not shown), the MAC header 302 includes a BSSID field 308. In the MBSSID beacon 300, the BSSID field 308 is set to the transmitted BSSID of the MBSSID set. For illustration purposes, the BSSID field 308 of the example MBSSID beacon 300 is set to the transmitted BSSID—"12:34:56:78:ab:c0" which is the BSSID of the transmitted VAP 108A, for example.

The frame body 304 includes payload information for the MBSSID beacon 300. The frame body 304 may include one or more transmitted VAP elements and at least one non-transmitted VAP element. For example, a transmitted VAP element 310 may include information elements associated with the transmitted VAP in the MBSSID set. In particular, the transmitted VAP element 310 may include various characteristics of the transmitted VAP. In some examples, the transmitted VAP element 310 may include any unique characteristics of the transmitted VAP (if any) and/or the characteristics that are common to all VAPs in the MBSSID set. Further, in some examples, the frame body 304 may include an MBSSID element 312. The MBSSID element 312 includes characteristics of the non-transmitted VAPs that are not inherited from the characteristics of the transmitted VAP, for example. In particular, the MBSSID element 312 may include fields such as an element ID 314, length 316, MaxBSSID indicator 318, and one or more sub-elements 320A and 320B. The element ID 314 provides the ID of MBSSID element 312 (which is typically number "71" as per IEEE 802.11ax Specification). The length 316 provides the length of the MBSSID element 312. The MaxBSSID indicator 318 represents an integer value (n) such that a maximum number of supported BSSIDs in the MBSSID set is $2^n$. Sub-elements 320A and 320B provide the characteristics of the non-transmitted VAPs (e.g., VAPs 108B and 108C of FIG. 1, respectively) corresponding to element ID 314. The number of sub-elements in the MBSSID element 312 may vary based on the number of the non-transmitted VAPs in the MBSSID set corresponding to the MBSSID element 312. In this example, the element ID 314, length 316, and MaxBSSID indicator 318 may be octets, and sub-elements 320A-320B may have variable lengths depending on the content of the sub-elements 320A-320B.

In the description hereinafter, details of the sub-element 320B are described. The other sub-element 320A may include similar details for respective non-transmitted VAP. In particular, the sub-element 320B provides characteristics of a non-transmitted VAP 108C, for example. The sub-element 320B may include a sub-element ID 324, length 326, and data 328. The sub-element ID 324 provides the identifier of sub-element 320B. The length 326 provides the length of sub-element 320A. The data 328 provides the characteristics of the non-transmitted VAP corresponding to the sub-element ID 324. In this example, data 328 provides information on the non-transmitted VAP, for example, the non-transmitted BSSID capability 330, an SSID 332, and an MBSSID index 334. The MBSSID index 334 represents an index number of the non-transmitted BSSID or the non-transmitted VAP. The client devices may use the MBSSID index 334 to determine the BSSID of the non-transmitted based on the transmitted BSSID contained in the BSSID field 308 using the technique described in section "9.4.2.45 Multiple BSSID element" of IEEE 802.11ax Specification.

Figure 4:
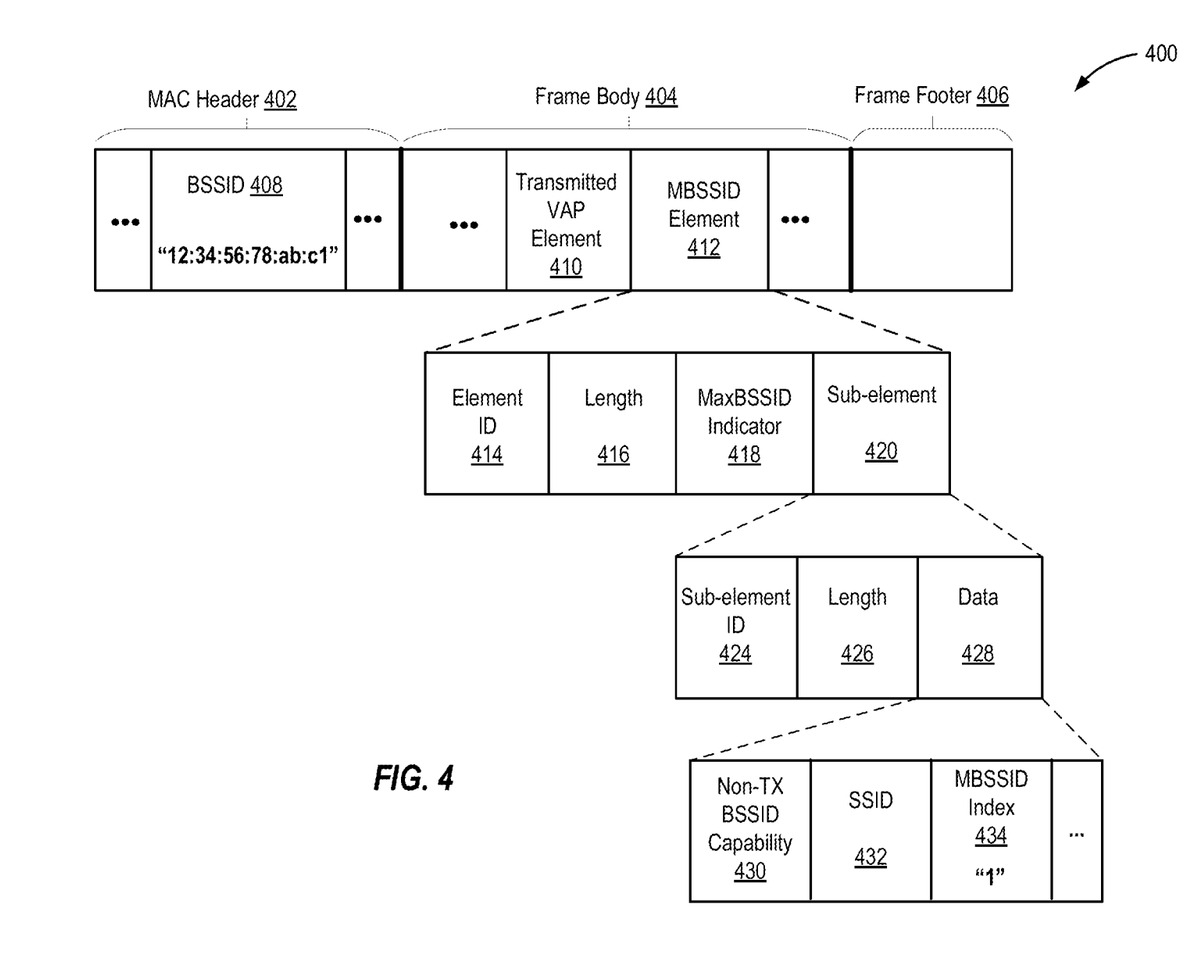
FIG. 4 depicts a block diagram illustrating a frame structure of an example reconfigured MBSSID beacon.

Turning to FIG. 4, a block diagram illustrating a frame structure of an example reconfigured MBSSID beacon 400 is depicted. The reconfigured MBSSID beacon 400 may also include one or more fields that are similar to those described in FIG. 3, certain details of which are not repeated herein. In comparison to the MBSSID beacon 300, the content of certain fields in the reconfigured MBSSID beacon 400 may be updated by an AP. For example, the reconfigured MBSSID beacon 400 may also include a MAC header 402, a frame body 404, and a frame footer 406. In the reconfigured MBSSID beacon 400, a BSSID field 408 in the MAC header 402 includes a BSSID of a newly selected transmitted VAP (e.g., the VAP 108B) which was previously a non-transmitted BSSID.

The frame body 404 includes a transmitted VAP element 410 and an MBSSID element 412. As only two VAPs are remaining in the MBSSID set due to the non-existence of the originally transmitted BSSID, the transmitted VAP element 410 in the frame body 404 may be updated to include information elements associated with the newly selected transmitted VAP (e.g., the VAP 108B which was previously a non-transmitted VAP). In particular, the transmitted VAP element 410 may include various characteristics of the newly selected transmitted VAP.

The MBSSID element 412 may include fields such as an element ID 414 (which is typically number "71" as per IEEE 802.11ax Specification), length 416 MBSSID element 412, MaxBSSID indicator 418, and a sub-element 420. The MaxBSSID indicator 418 represents an integer value (n) such that a maximum number of supported BSSIDs in the MBSSID set is $2^n$. The sub-element 420 provides the characteristics of the non-transmitted VAP (e.g., the VAP 108C). In particular, the reconfigured MBSSID beacon includes a single sub-element 420 compared to the MBSSID beacon 300 as the original transmitted VAP does not exist and one of the two non-transmitted VAPs has been chosen as a new transmitted VAP whose BSSID is included in the BSSID field 408.

The sub-element 420 may include a sub-element ID 424, a length 426, and data 428. The sub-element ID 324 provides the identifier of sub-element 420. The length 426 provides the length of sub-element 420. The data 428 provides the characteristics of the non-transmitted VAP corresponding to sub-element ID 424. In this example, data 428 provides information, such as, a non-transmitted BSSID capability 430, an SSID 432, and an MBSSID index 434. The MBSSID index 334 represents an index number of the non-transmitted VAP. Due to the non-existence of the original transmitted BSSID, the MBSSID index 434 may also have an updated value in comparison to the MBSSID beacon 300 of FIG. 3. For example, as depicted in the reconfigured MBSSID beacon 400, the MBSSID index 434 for the non-transmitted VAP is shown as revised to "1".

Figure 5:
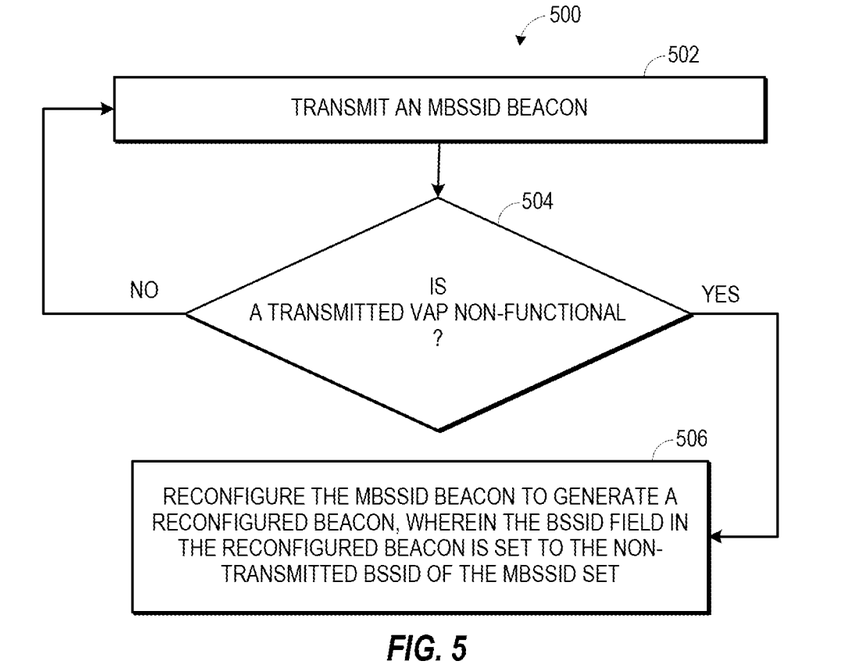
FIG. 5 depicts a flowchart of an example method for managing an MBSSID beacon in an event of non-functioning of a transmitted VAP of an MBSSID set.

FIG. 5 depicts an example method 500 for managing an MBSSID beacon in an event of non-functioning of a transmitted VAP of an MBSSID set. The method 500 includes several steps in an order. However, the order of steps shown in FIG. 5 should not be construed as the only order for the steps. The steps may be performed at any time, in any order. Additionally, the steps may be repeated or omitted as needed. In some examples, the steps shown in FIG. 5 may be performed by any suitable device, such as an AP (e.g., the AP 102 of FIG. 1). In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium. The processing resource may fetch, decode, and execute instructions, to reconfigure the MBSSID beacon. As an alternative or in addition to retrieving and executing instructions, the processing resource may include one or more electronic circuits that include electronic components for performing the functionality of one or more instructions, such as an FPGA, ASIC, or other electronic circuits. A machine-readable storage medium may be any electronic, magnetic, optical, or other physical storage device that contains or stores executable instructions. Thus, a machine-readable storage medium may be, for example, a RAM, an NVRAM, an EEPROM, a storage device, an optical disc, and the like. In some embodiments, a machine-readable storage medium may be a non-transitory storage medium, where the term "non-transitory" does not encompass transitory propagating signals.

At block 502, the AP may transmit an MBSSID beacon (e.g., the MBSSID beacon 300 of FIG. 3). The MBSSID beacon includes BSSID field and an MBSSID element. The MBSSID element corresponds to an MBSSID set comprising a transmitted BSSID associated with a transmitted VAP and one or more non-transmitted BSSIDs associated with a non-transmitted VAP. In particular, the BSSID field in the MBSSID beacon is set to the transmitted BSSID (e.g., the BSSID of the transmitted VAP 108A-"12:34:56:78:ab:c0"). The AP may transmit the MBSSID beacon via any of its radio. For example, the AP may transmit the MBSSID beacon via any of a 2.4 GHz radio, a 5 GHz radio, or a 6 GHz radio of the AP.

The AP maintains a configuration data corresponding to each of the VAPs configured on the AP. The configuration data for a given VAP may include several settings such as radio details, SSID, channel information, BSSID, communication capabilities, and the like. In some examples, the AP may continuously monitor configuration data corresponding to the transmitted VAP to determine whether the transmitted VAP is functioning. In particular, at block 504, the AP may perform a check to determine that the transmitted VAP is non-functional. At block 504, if the AP detects that the transmitted VAP is deleted or inactivated based on the monitoring of the configuration data, the AP may determine that the transmitted VAP is non-functional. If the configuration data of the transmitted VAP remains stored and the transmitted BSSID remains active, the AP may determine that the transmitted VAP is functional. At block 504, if it is determined that the transmitted VAP is functional, the AP may continue to send the MBSSID with the same transmitted BSSID at block 502.

However, at block 504, if it is determined that the transmitted VAP is non-functional, the AP, at block 506, may reconfigure the MBSSID beacon (e.g., the MBSSID beacon 300 depicted in FIG. 3) to generate a reconfigured MBSSID beacon (e.g., the MBSSID beacon 400 depicted in FIG. 4). In some examples, reconfiguring the MBSSID beacon may include updating one or more fields, for example, a BSSID field, the transmitted VAP element, and an MBSSID element, in the MBSSID beacon. Details of how the MBSSID beacon is reconfigured are described in conjunction with FIG. 6. Once the reconfigured MBSSID is generated, the AP transmits the reconfigured MBSSID beacon to the client devices. The AP may transmit the reconfigured MBSSID beacon via any of its radio. For example, the AP may transmit the reconfigured MBSSID beacon via any of the 2.4 GHz radio, the 5 GHz radio, or the 6 GHz radio of the AP. The client devices that are configured with updated frame filtering logic can process the reconfigured MBSSID beacon. Details of the filtering of the MBSSID beacons by a client device are described in conjunction with FIG. 7.

Figure 6:
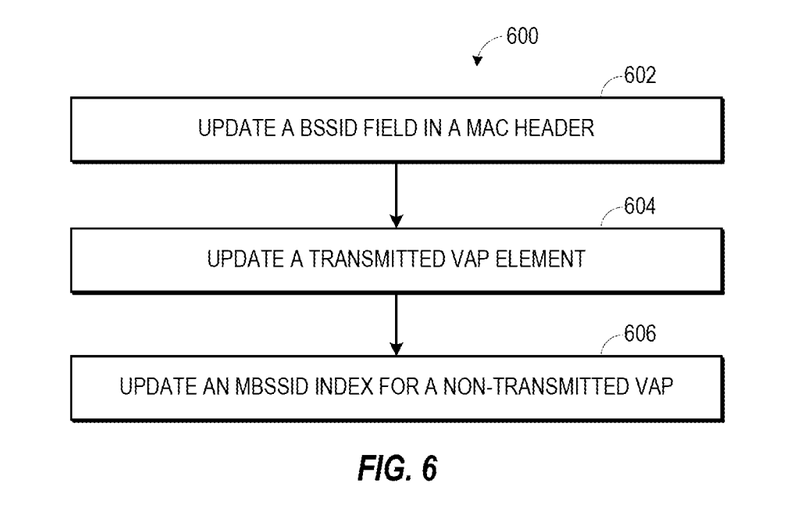
FIG. 6 depicts a flowchart of an example method for reconfiguring an MBSSID beacon.

FIG. 6 depicts an example method 600 for reconfiguring an MBSSID beacon to generate a reconfigured MBSSID beacon (e.g., the reconfigured MBSSID beacon 400 of FIG. 4). In particular, the method 600 represents several operations performed at block 506 of FIG. 5. The method 600 includes several steps in an order. However, the order of steps shown in FIG. 6 should not be construed as the only order for the steps. The steps may be performed at any time, in any order. Additionally, the steps may be repeated or omitted as needed. In some examples, the steps shown in FIG. 6 may be performed by any suitable device, such as an AP (e.g., the AP 102 of FIG. 1). In some examples, the suitable device may include a hardware processing resource and/or other hardware devices suitable for the retrieval and execution of instructions stored in a machine-readable storage medium.

At block 602, the AP may update the BSSID field in the MAC header of the MBSSID beacon. In particular, as the originally transmitted BSSID/transmitted VAP is no more existing, the AP may select one of the non-transmitted BSSID to be included in the BSSID field of the MBSSID beacon. The new BSSID that is included in the BSSID fields is now referred to as the transmitted BSSID. For example, such a new transmitted BSSID may be the BSSID of the VAP 108B (see FIG. 4, for example) in the implementation of the system 100 of FIG. 1.

Further, in some examples, at block 604, the AP may update a transmitted VAP element (e.g., the transmitted VAP element 310). In particular, the transmitted VAP element may be updated to include information elements associated with the new transmitted VAP (e.g., now the VAP 108B which was previously a non-transmitted VAP) and information such as any unique characteristics of the transmitted VAP (if any) and/or the characteristics that are common to all other non-transmitted VAPs in the same MBSSID set may be included in the transmitted VAP element.

Furthermore, in some examples, as the number of VAPs in the MBSSID set are updated, at block 606, the AP may also update the MBSSID element (e.g., the MBSSID element 312). In particular, as the VAP 108A is removed and the VAP 108B is now chosen as the transmitted VAP, the sub-element 320A in the MBSSID element 312 may be removed. Moreover, in some examples, the MBSSID index 334 may also be updated by the AP due to the change in the BSSID field of the MBSSID beacon.

Figure 7:
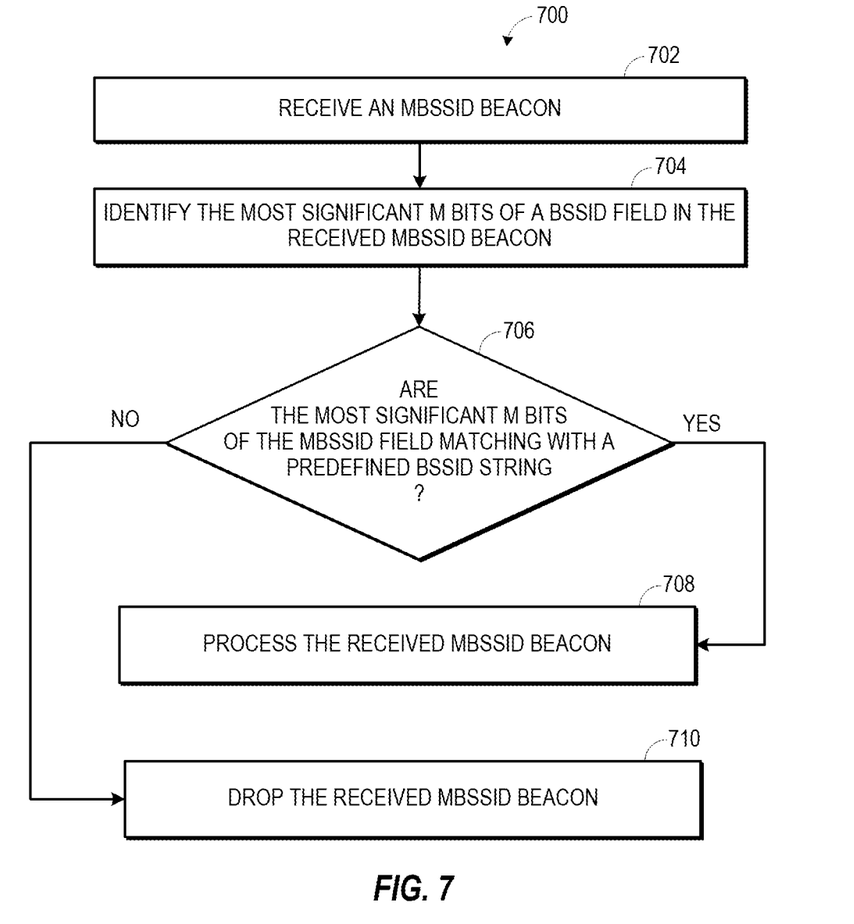
FIG. 7 depicts a flowchart of an example method of frame filtering by a client device.

FIG. 7 depicts a flow chart of an example method 700 of frame filtering by any of the client devices (e.g., the client devices 106A-106D of FIG. 1) communicatively connected to the AP (e.g., the AP 102 of FIG. 1). The method 700 includes several steps in an order. However, the order of steps shown in FIG. 7 should not be construed as the only order for the steps. The steps may be performed at any time, in any order. Additionally, the steps may be repeated or omitted as needed. In some examples, the steps shown in FIG. 7 may be performed by any suitable device, such as a client device (e.g., the client devices 106A-106D of FIG. 1) communicatively connected to the AP (e.g., the AP 102 of FIG. 1).

At block 702, the client device receives an MBSSID beacon. The MBSSID beacon may be any of an original MBSSID beacon with the VAP 108A as the transmitted VAP (e.g., the MBSSID beacon 300 of FIG. 3) or a reconfigured MBSSID beacon with a new transmitted VAP (e.g., the reconfigured MBSSID beacon 400 of FIG. 4).

In accordance with the examples presented herein, instead of a client device (e.g., any of the client devices 106A-106D) filtering the frames based on the full length of BSSID field 308, the client device is configured to filter the beacons based on a predetermined number of most significant bits (MSBs) of the BSSID field 308 so that the client device can process the MBSSID beacons from any of the BSSID of the MBSSID set. In one example, upon receipt of the MBSSID beacon, the client device, at block 704, may identify the most significant M bits based on a MaxBSSID indicator listed the MBSSID element in the MBSSID beacon. In particular, the client device may determine a number of the most significant M bits as a difference between the length of the BSSID field, using the relationship of equation 1, for example. If MaxBSSID indicator n=4 and the size of the transmitted BSSID is 48 bits, the most significant M bits may be determined as 44 (=48−4) bits. Accordingly, the client device may extract the most significant M bits from the BSSID field in the MBSSID beacon.

Further, at block 706, may perform a check to determine whether the most significant M bits of the MBSSID field of the received MBSSID beacon match with a predefined BSSID string. The predefined BSSID string may be preconfigured in the client device during the initial set-up of communication between the AP and the client device. The length of the predefined BSSID string is equal to the predetermined number of most significant bits. For example, the predefined BSSID string may have M number of bits that are common across all the BSSIDS in an MBSSID set. For example, in the case of the MBSSID set configuration depicted in FIG. 2, the predefined BSSID string may be "12:34:56:78:ab:c" that has M bits and is common across all three BSSIDs in the MBSSID set. At block 706, if the AP determines that the most significant M bits of the MBSSID field in the received MBSSID beacon match with the predefined BSSID string, the client may further process the beacon at block 708. The example processing actions at the block 708 may include deducing non-transmitted BSSIDs, determining the VAP to which the client device is associated, parsing respective information elements from the received MBSSID beacon if the VAP to which the client device is associated is identified in the received MBSSID beacon, and/or updating communication characteristics of the client device in accordance with the received MBSSID beacon. However, if the AP determines that the most significant M bits of the MBSSID field in the received MBSSID beacon do not match with the predefined BSSID string, the client device, at block 710, may reject/drop the received MBSSID beacon.

In some examples, a client device may apply the described frame filtering method (e.g., implemented via steps 702-710) after determining that the client device has rejected/dropped a predetermined number of MBSSID beacons. In some examples, the client device may apply the described frame filtering method for all beacons that it received. As will be appreciated, with the client device filtering the incoming beacon frames based on the predetermined number of MSBs as described hereinabove, the client device can process the MBSSID beacons with the BSSID field set to any non-transmitted BSSID of the MBSSID set. The use of such reconfigured MBSSID beacon and the updated frame filter logic at the client device avoids or minimizes the need for de-authenticating the client device and thereby reducing the network outage for the client device. The reduced network outage improves the reliability of the wireless network established via the AP.

Figure 8:
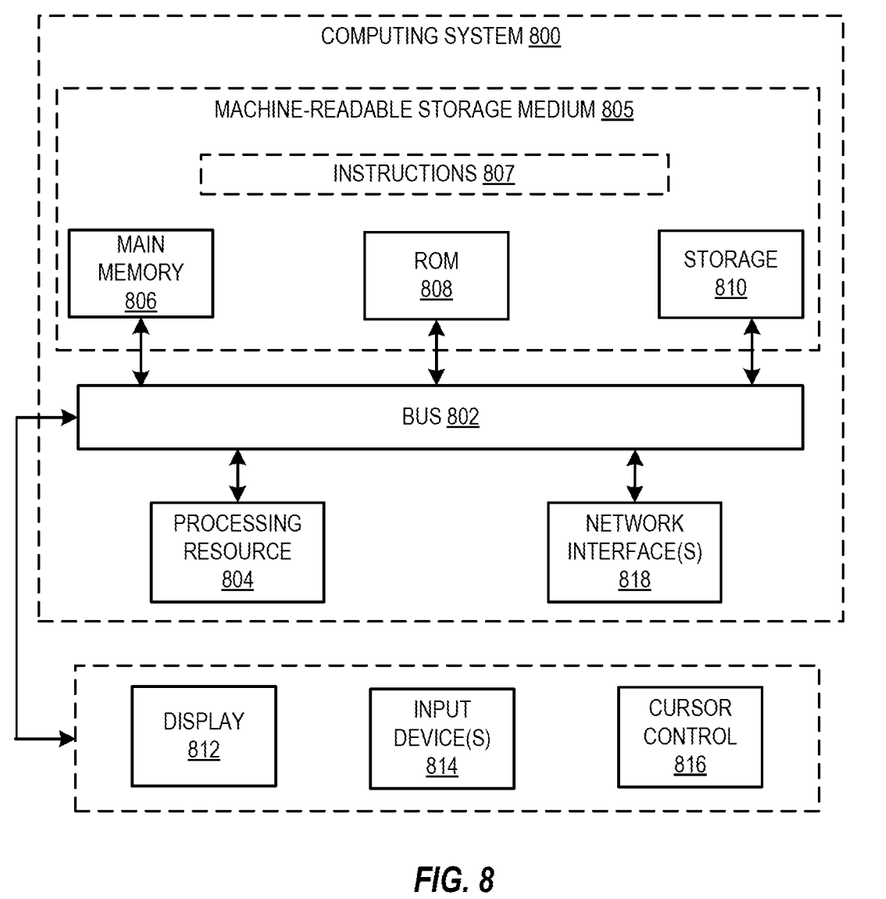
FIG. 8 depicts a block diagram of an example computing system in which various of the examples described herein may be implemented.

FIG. 8 depicts a block diagram of an example computing system 800 in which various of the examples described herein may be implemented. In some examples, the computing system 800 may be configured to operate as an AP and can perform various operations described in one or more of the earlier drawings. In some other examples, the computing system 800 may be configured to operate as a client device.

The computing system 800 may include a bus 802 or other communication mechanisms for communicating information, a hardware processor, also referred to as processing resource 804 and a machine-readable storage medium 805 coupled to the bus 802 for processing information. In some examples, the processing resource 804 may include one or more of CPUs, semiconductor-based microprocessors, and/or other hardware devices suitable for retrieval and execution of instructions stored in a machine-readable storage medium 805. The processing resource 804 may fetch, decode, and execute instructions, to reconfigure the MBSSID beacon. As an alternative or in addition to retrieving and executing instructions, the processing resource 804 may include one or more electronic circuits that include electronic components for performing the functionality of one or more instructions, such as an FPGA, an ASIC, or other electronic circuits.

In some examples, the machine-readable storage medium 805 may include a main memory 806, such as a RAM, cache and/or other dynamic storage devices, coupled to the bus 802 for storing information and instructions to be executed by the processing resource 804. The main memory 806 may also be used for storing temporary variables or other intermediate information during the execution of instructions to be executed by the processing resource 804. Such instructions, when stored in storage media accessible to the processing resource 804, render the computing system 800 into a special-purpose machine that is customized to perform the operations specified in the instructions. The machine-readable storage medium 805 may further include a read-only memory (ROM) 808 or other static storage device coupled to the bus 802 for storing static information and instructions for the processing resource 804. Further, in the machine-readable storage medium 805, a storage device 810, such as a magnetic disk, optical disk, or USB thumb drive (Flash drive), etc., may be provided and coupled to the bus 802 for storing information and instructions.

Further, in some implementations, the computing system 800 may be coupled, via the bus 802, to a display 812, such as a liquid crystal display (LCD) (or touch-sensitive screen), for displaying information to a computer user. In some examples, an input device 814, including alphanumeric and other keys (physical or software generated and displayed on touch-sensitive screen), may be coupled to the bus 802 for communicating information and command selections to the processing resource 804. Also, in some examples, another type of user input device may be a cursor control 816, such as a mouse, a trackball, or cursor direction keys may be connected to the bus 802. The cursor control 816 may communicate direction information and command selections to the processing resource 804 for controlling cursor movement on the display 812. In some other examples, the same direction information and command selections as cursor control may be implemented via receiving touches on a touch screen without a cursor.

In some examples, the computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 800 also includes a network interface 818 coupled to bus 802. The network interface 818 provides a two-way data communication coupling to one or more network links that are connected to one or more local networks. For example, the network interface 818 may be an integrated services digital network (ISDN) card, cable modem, satellite modem, or a modem to provide a data communication connection to a corresponding type of telephone line. As another example, the network interface 818 may be a local area network (LAN) card or a wireless communication unit (e.g., Wi-Fi chip/module).

In some examples, the machine-readable storage medium 805 (e.g., one or more of the main memory 806, the ROM 808, or the storage device 810) may store instructions 807 which when executed by the processing resource 804 may cause the processing resource 804 to execute one or more of the methods/operations described hereinabove. The instructions 807 may be stored on any of the main memory 806, the ROM 808, or the storage device 810. In some examples, the instructions 807 may be distributed across one or more of the main memory 806, the ROM 808, or the storage device 810. In some examples, when the computing system 800 is configured to operate as an AP, the instructions 807 may include instructions which when executed by the processing resource 804 may cause the processing resource 804 to perform one or more of the methods described in FIGS. 5-6. In some examples, when the computing system 800 is configured to operate as a client device, the instructions 807 may include instructions which when executed by the processing resource 804 may cause the processing resource 804 to perform the method described in FIG. 7.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise.

What is claimed is:

1. A method comprising:
   transmitting, by an access point (AP), a beacon comprising a basic service set identifier (BSSID) field and a Multiple BSSID (MBSSID) element, wherein the MBSSID element corresponds to an MBSSID set comprising a transmitted BSSID associated with a transmitted virtual access point (VAP) and a non-transmitted BSSID associated with a non-transmitted VAP, and wherein the BSSID field in the beacon is set to the transmitted BSSID;
   dynamically reconfiguring, by the AP, the beacon to generate a reconfigured beacon upon determining that the transmitted VAP is non-functional, wherein the BSSID field in the reconfigured beacon is set to the non-transmitted BSSID of the MBSSID set; and
   transmitting, by the AP, the reconfigured beacon, wherein the transmission of the reconfigured beacon reduces or avoids network outage for client devices associated with the non-transmitted VAP when the transmitted VAP is non-functional.

2. The method of claim 1, determining whether the transmitted VAP is non-functional comprises:
monitoring configuration updates corresponding to the transmitted VAP; and
determining that the transmitted VAP is removed based on the configuration updates, wherein the transmitted VAP is determined to be non-functional if the transmitted VAP is removed.

3. The method of claim 1, wherein the transmitted BSSID and the non-transmitted BSSID are contiguous.

4. The method of claim 1, wherein the MBSSID set comprises the transmitted BSSID and a plurality of non-transmitted BSSIDs, and wherein dynamically reconfiguring the beacon to be transmitted comprises replacing the transmitted BSSID with one of the plurality of non-transmitted BSSIDs in response to determining that the transmitted VAP is non-functional.

5. The method of claim 4, wherein dynamically reconfiguring the beacon to be transmitted further comprises updating an MBSSID index corresponding to a non-transmitted VAP in the MBSSID element, wherein the MBSSID index defines an index number of the non-transmitted BSSID in the MBSSID set.

6. The method of claim 1, wherein the beacons and the reconfigured beacon transmitted by the AP are received by a client device, wherein the client device is configured to filter the beacons and the reconfigured beacon based on most significant M bits of the BSSID field.

7. The method of claim 6, further comprising identifying, by the client device, the most significant M bits based on a MaxBSSID indicator in the MBSSID element, wherein the MaxBSSID indicator represents an integer value (n) such that a maximum number of BSSIDs in the MBSSID set is $2^n$, wherein M=L−n and L is a length of the BSSID field.

8. The method of claim 1, wherein the beacon and the reconfigured beacon are transmitted via a 6 GHz radio of the AP.

9. An AP comprising:
a non-transitory machine-readable storage medium storing executable instructions; and
a processing resource communicatively coupled to the non-transitory machine-readable storage medium, wherein the processing resource is configured to execute one or more of the instructions to:
transmit a beacon comprising a BSSID field and an MBSSID element, wherein the MBSSID element corresponds to an MBSSID set comprising a transmitted BSSID associated with a transmitted VAP and a non-transmitted BSSID associated with a non-transmitted VAP, and wherein the BSSID field in the beacon is set to the transmitted BSSID;
reconfigure the beacon to generate a reconfigured beacon upon determining that the transmitted VAP is non-functional, wherein the BSSID field in the reconfigured beacon is set to the non-transmitted BSSID of the MBSSID set; and
transmit the reconfigured beacon, wherein the transmission of the reconfigured beacon reduces or avoids network outage for client devices associated with the non-transmitted VAP when the transmitted VAP is non-functional.

10. The AP of claim 9, wherein the processing resource executes one or more instructions to host a plurality of VAPs comprising the transmitted VAP and the non-transmitted VAP on the AP.

11. The AP of claim 9, wherein the processing resource executes one or more of the instructions to:
monitor configuration updates corresponding to the transmitted VAP; and
determining that the transmitted VAP is removed based on the configuration updates, wherein the transmitted VAP is determined to be non-functional if the transmitted VAP is removed.

12. The AP of claim 9, wherein the transmitted BSSID and the non-transmitted BSSID are contiguous.

13. The AP of claim 9, wherein the MBSSID set comprises the transmitted BSSID and a plurality of non-transmitted BSSIDs, and wherein, to reconfigure the beacon to be transmitted, the processing resource executes one or more of the instructions to replace the transmitted BSSID with one of the plurality of non-transmitted BSSIDs in response to determining that the transmitted VAP is non-functional.

14. The AP of claim 9, wherein, to reconfigure the beacon to be transmitted, the processing resource executes one or more of the instructions to update an MBSSID index corresponding to a non-transmitted VAP in the MBSSID element, wherein the MBSSID index defines an index number of the non-transmitted BSSID in the MBSSID set.

15. The AP of claim 9, wherein the beacon and the reconfigured beacon are transmitted via any of a 2.4 GHz radio, a 5 GHz radio, or a 6 GHz radio of the AP.

* * * * *